(12) United States Patent
Tenghamn et al.

(10) Patent No.: US 7,834,632 B2
(45) Date of Patent: Nov. 16, 2010

(54) RECEIVER STREAMER SYSTEM AND METHOD FOR MARINE ELECTROMAGNETIC SURVEYING

(75) Inventors: Stig Rune Lennart Tenghamn, Katy, TX (US); Eivind Fromyr, Houston, TX (US); Marit Ronaess, Gjettum (NO); Rune Johan Magnus Mattsson, Trangsund (SE); Ulf Peter Lindqvist, Segeltorp (SE); Lena Kristina Frenje Lund, Uppsala (SE); Anders Göran Mattsson, Høvik (NO); Toril Margrethe Bruun Vaage, Oslo (NO)

(73) Assignee: PGS Geophysical AS, Lysaker (NO)

( * ) Notice: Subject to any disclaimer, the term of this patent is extended or adjusted under 35 U.S.C. 154(b) by 262 days.

(21) Appl. No.: 11/998,971

(22) Filed: Dec. 3, 2007

(65) Prior Publication Data

US 2009/0140741 A1 Jun. 4, 2009

(51) Int. Cl.
*G01V 3/15* (2006.01)
*G01V 3/02* (2006.01)
*G01V 3/08* (2006.01)
*G01V 3/12* (2006.01)

(52) U.S. Cl. .................. 324/365; 324/347; 324/357

(58) Field of Classification Search ......... 324/347–348, 324/354, 357–358, 365; 702/7, 11–13; 367/14–19
See application file for complete search history.

(56) References Cited

U.S. PATENT DOCUMENTS

| 7,191,063 B2 | 3/2007 | Tompkins |
| 7,471,089 B2 * | 12/2008 | Zerilli et al. ............ 324/365 |
| 2006/0238200 A1 * | 10/2006 | Johnstad ................ 324/337 |

FOREIGN PATENT DOCUMENTS

| EP | 1 850 152 | 10/2007 |
| WO | WO 02/14906 | 2/2002 |
| WO | WO 2005/006022 | 1/2005 |

OTHER PUBLICATIONS

European Search Report, May 19, 2010.

* cited by examiner

*Primary Examiner*—Bot L LeDynh
(74) *Attorney, Agent, or Firm*—E. Eugene Thigpen; Shannon Powers; Richard A. Fagin

(57) ABSTRACT

A receiver streamer system for marine electromagnetic surveying includes a first streamer, and a second streamer disposed substantially parallel to and spaced apart from the first streamer. A first pair of electrodes is associated with the first streamer and a second pair of electrodes is associated with the second streamer. Each of the first and second pairs of electrodes is functionally associated with a voltage measuring circuit configured to measure voltage along an inline direction. At least one electrode on each of the first and second streamers is configured and associated with a voltage measuring circuit to make voltage measurements in a cross-line direction.

9 Claims, 4 Drawing Sheets

RECEIVER STREAMER SYSTEM AND METHOD FOR MARINE ELECTROMAGNETIC SURVEYING

CROSS REFERENCE TO RELATED APPLICATIONS

Not applicable

STATEMENT REGARDING FEDERALLY SPONSORED RESEARCH OR DEVELOPMENT

Not applicable

FIELD OF THE INVENTION

The invention relates generally to the field of marine electromagnetic surveying. More specifically, the invention relates to a method and system for detecting electromagnetic signals in a marine environment.

BACKGROUND OF THE INVENTION

Marine controlled source electromagnetic (CSEM) surveying is a geophysical surveying technique that uses electromagnetic (EM) energy to identify hydrocarbon reserves in formations below the bottom of a body of water such as a lake or the ocean. In a typical marine CSEM survey, an EM source and a number of EM receivers are located at or near the bottom of a body of water. The EM source is typically towed over an area of interest in the Earth's subsurface, and the receivers are disposed on the water bottom over the area of interest to obtain signals related to the distribution of electrical resistivity in the subsurface area of interest. Such surveying is performed for a range of EM source and EM receiver positions. The EM source emits either or both a time varying electric field and a time varying magnetic field, which propagate outwardly into the overlying seawater and downwardly into the formations below the water bottom. The receivers most commonly used detect and record the induced electric field at or near the water bottom. The time varying EM field may be induced by passing electric current through an antenna. The electric current may be continuous wave and have one or more discrete frequencies. Such current passing through an antenna is used for what is referred to as "frequency domain CSEM" surveying. It is also known in the art to apply direct current to an antenna, and produce transient EM fields by switching the current. Such switching may include, for example, switching on, switching off, inverting polarity and inverting polarity after a switch on or switch off event. Such switching may be equally time spaced or may be in a time series known as a "pseudo random binary sequence." Such switched current is used to conduct what is referred to as a "transient CSEM" survey. One type of such survey is provided under the service mark MTEM, which is a service mark of an affiliate of the assignee of the present invention.

The EM energy is rapidly attenuated in the conductive seawater, but in less conductive subsurface formations is attenuated less and propagates more efficiently. If the frequency of the EM energy is low enough, the EM energy can propagate deep into the subsurface formations. Energy "leaks" from resistive subsurface layers, e.g., a hydrocarbon-filled reservoir, back to the water bottom. When the source-receiver spacing ("offset") is comparable to or greater than the depth of burial of the resistive layer (the depth below the water bottom) the energy reflected from the resistive layer will dominate over the transmitted energy. CSEM surveying uses the large resistivity contrast between highly resistive hydrocarbons and conductive aqueous saline fluids disposed in permeable subsurface formations to assist in identifying hydrocarbon reservoirs in the subsurface.

FIG. 1 shows a typical marine CSEM surveying system, as illustrated in U.S. Pat. No. 7,191,063 issued to Tompkins. In the arrangement shown in the '063 patent, the subsurface layers of interest include an overburden layer 8, an underburden layer 9, and a hydrocarbon reservoir 12. A surface vessel 14 moves on the surface 2 of a body of water 4. A submersible vehicle 19 carrying an EM source 22 in the form of a horizontal electric dipole (HED) transmitter 22 is attached to the surface vessel 14 by an umbilical cable 16. One or more remote receivers 25 are located on the seafloor 6. Each of the receivers 25 includes an instrument package 26, a detector 24, a flotation device 28, and a ballast weight (not shown). The detector 24 comprises three orthogonal electric dipole detectors and three orthogonal magnetic field detectors. The electric dipole detectors are sensitive to components of the electric fields induced by the HED transmitter 22 in the vicinity of the receiver 25 and produce corresponding electric field detector signals. The magnetic field detectors are sensitive to components of the magnetic fields induced by the HED transmitter 22 in the vicinity of the receiver 25 and produce corresponding magnetic field detector signals. The instrument package 26 records the detector signals. Recording of data requires complex systems that have to be deployed and positioned on the seabed and record data autonomously when positioned on the seabed. To cover large areas with a dense receiver spacing may be impractical.

FIG. 2A is a schematic of a marine CSEM surveying system, as illustrated in International Publication No. WO 02/14906. The system disclosed in the '906 publication includes a vessel 31 towing a cable (or streamer) 32 just above the seabed 33. The cable 32 carries a transmitter dipole antenna 34 and several receiver dipoles 35. The transmitter dipole antenna 34 is controlled from the vessel 31 via the cable 32, and the responses detected by the receiver dipoles 35 are relayed back to the vessel 31 in real time via the cable 32. The WO 02/14906 publication also shows an arrangement, as illustrated in FIG. 2B herein, in which the vessel 31 tows three parallel cables 41, 42, 43, each carrying a series of receivers 45, 46, 47. The spacing between the receivers 45, 46, 47 is achieved by means of a spar 44. A transmitter 48 is located on the cable 42. The transmitter 48 has two dipole antennae arranged mutually at right angles. Each receiver also comprises two dipoles mutually at right angles. Measurements are taken with the transmitter and receiver both inline and parallel, and the two sets of measurements are compared. A characteristic difference in values indicates a highly resistive layer located beneath highly conductive layer.

SUMMARY OF THE INVENTION

A receiver streamer system for marine electromagnetic surveying according to one aspect of the invention includes a first streamer, and a second streamer disposed substantially parallel to and spaced apart from the first streamer. A first pair of electrodes is associated with the first streamer and a second pair of electrodes is associated with the second streamer. Each of the first and second pairs of electrodes is functionally associated with a voltage measuring circuit configured to measure voltage along an inline direction. At least one electrode on each of the first and second streamers is configured and associated with a voltage measuring circuit to make voltage measurements in a cross-line direction.

A method for marine electromagnetic surveying according to another aspect of the invention includes towing at least two streamers laterally spaced apart from each other through a body of water. Each of the at least two streamers has at least one pair of electrodes. Voltage is measured across the at least one pair of electrodes on each streamer to obtain inline voltage measurements. Voltage is measured across a pair of electrodes including at least one electrode on each of the two streamers to obtain cross-line voltage measurements.

Other aspects and advantages of the invention will be apparent from the following description and the appended claims.

BRIEF DESCRIPTION OF THE DRAWINGS

The accompanying drawings, described below, illustrate typical embodiments of the invention and are not to be considered limiting of the scope of the invention, for the invention may admit to other equally effective embodiments. The figures are not necessarily to scale, and certain features and certain view of the figures may be shown exaggerated in scale or in schematic in the interest of clarity and conciseness.

DETAILED DESCRIPTION

Figure 3A:
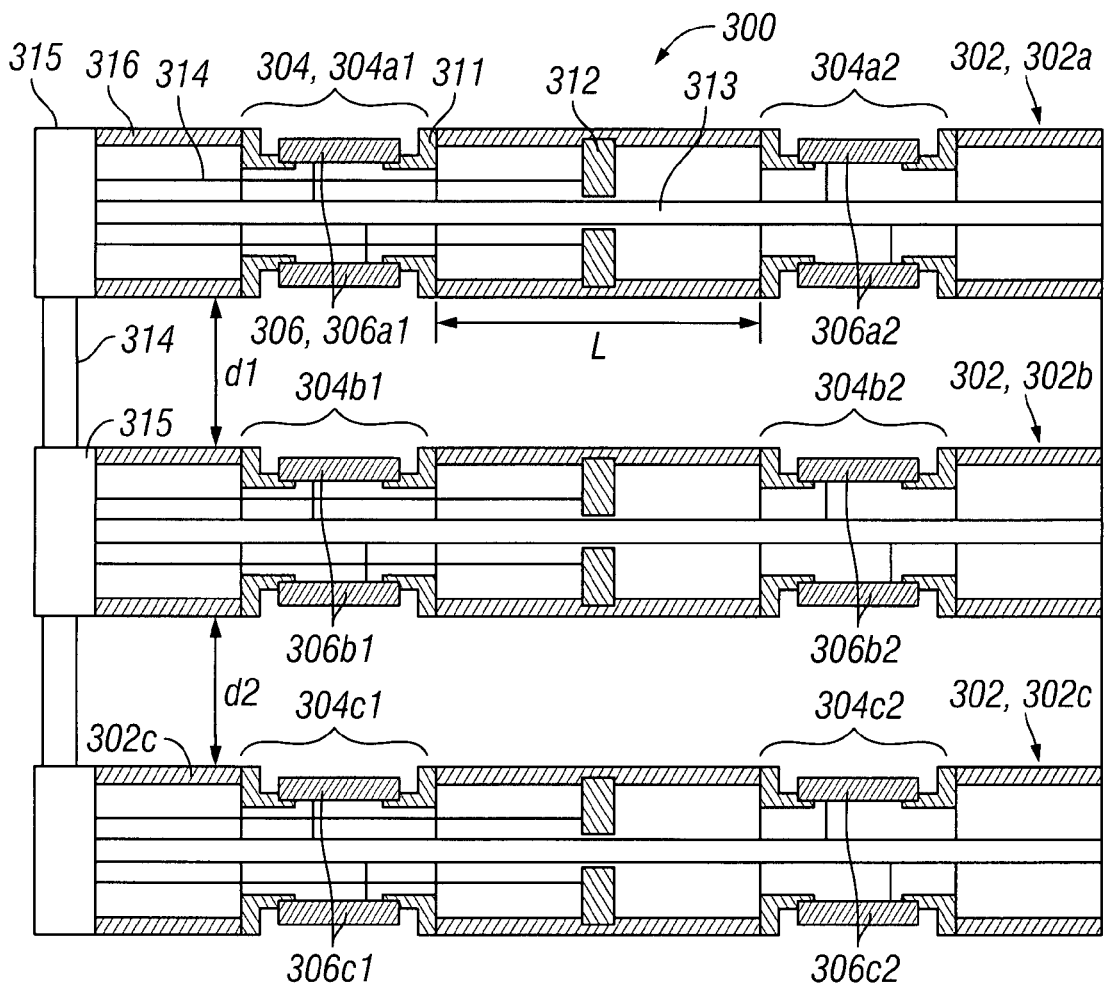
FIG. 3A is a schematic of an example towed EM receiver system.

FIG. 3A shows an example of an electromagnetic receiver streamer system 300 for marine electromagnetic surveying. The receiver streamer system 300 includes two or more receiver cables (or streamers) 302. In the present example, three receiver cables 302 are shown, although it should be clearly understood that the number of streamers is not a limit on the scope of this invention. When convenient, the suffixes "a," "b," and "c" may be used to separately identify each of the streamers 302. Towing equipment (not shown separately) of types known in the art for marine seismic surveying may be used to tow the streamers 302 so that they are substantially parallel to each other and are laterally spaced apart by a predetermined distance. Where the receiver streamer system 300 includes more than two streamers 302, the lateral spacing between adjacent receiver cables 302 may or may not be uniform across the system. For example, d1 represents the lateral spacing between receiver cables 302a and 302b, and d2 represents the lateral spacing between receiver cables 302b and 302c, where d1 and d2 may or may not have the same value. Typically, the lateral spacing between adjacent receiver cables 302 can be in a range from 30 meters to 1,000 meters. The spacing between adjacent streamers 302 would generally be selected based on the depth of the subsurface layers of interest.

Figure 1:
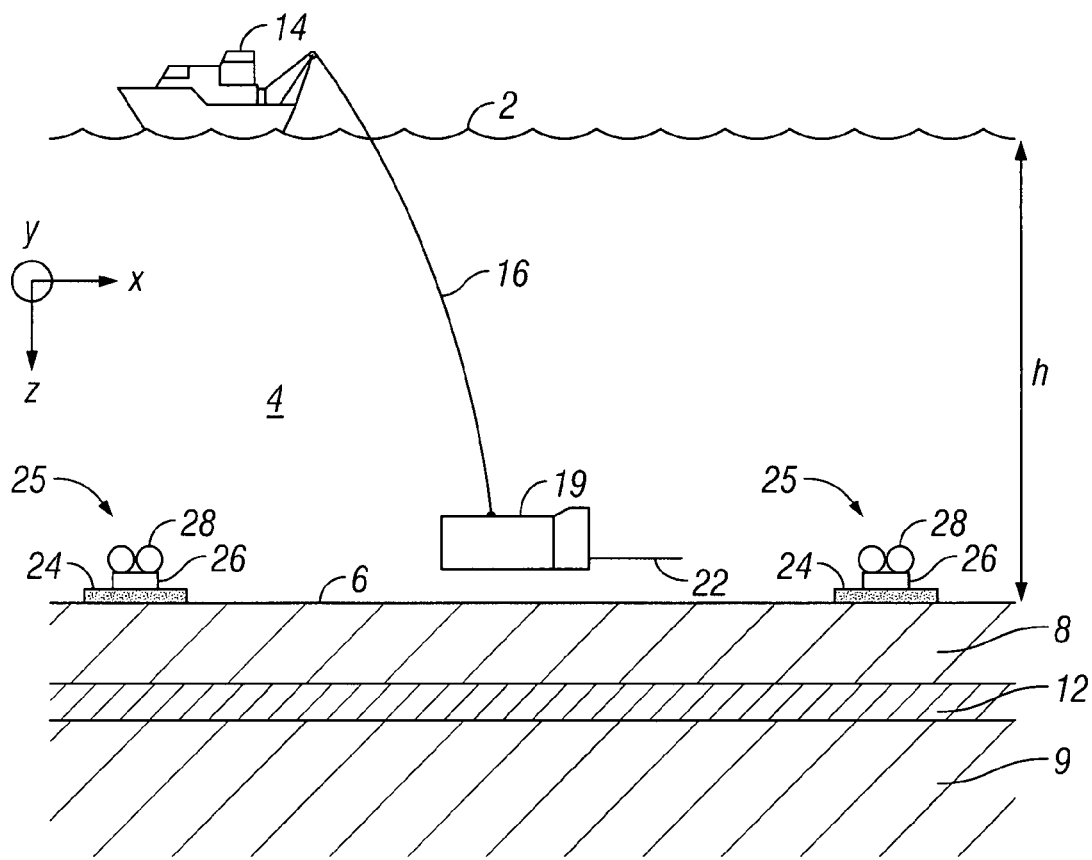
FIGS. 1, 2A, and 2B are schematics of prior-art marine CSEM surveying systems.
Figure 2A:
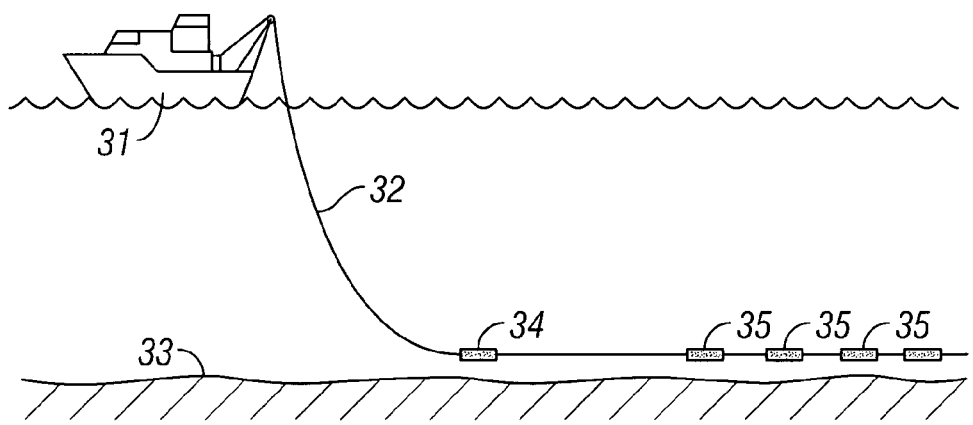
Figure 2B:
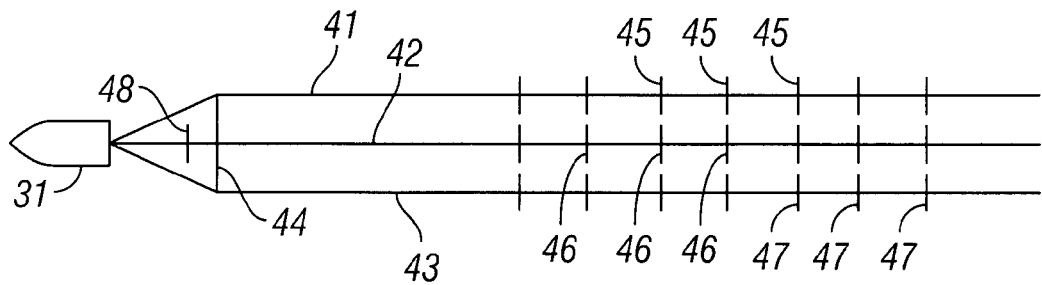

Each streamer 302 includes at least one, and preferably includes a plurality, of receiver nodes 304 at spaced apart positions along the length of the streamer 302. The spacing L between adjacent receiver nodes 304 may or may not be uniform along the length of the streamer 302 and may in some examples be in a range from 10 meters to 500 meters. Typically, the arrangement of the streamers 302 is such that a receiver node 304 on one receiver cable 302 forms a substantially matching pair with a receiver node 304 on an adjacent receiver cable 302. A matching pair in the present context means that the nodes are at a substantially equal distance behind the towing vessel (e.g., 31 in FIG. 2B). For example, receiver node 304a1 on streamer 302a forms a substantially matching pair with receiver node 304b1 on streamer 302b, and such arrangement may be repeated elsewhere in the various streamers 302.

A pair of receiver electrodes 306 may be disposed at each receiver node 304. For example, paired receiver electrodes 306a1 and 306a2 are disposed at receiver nodes 304a1 and 304a2, respectively, on streamer 302a. Paired receiver electrodes 306b1 and 306b2 are disposed at receiver nodes 304b1 and 304b2, respectively, on streamer 302b. Paired receiver electrodes 306c1, and 306c2 are disposed at receiver nodes 304c1 and 304c2, respectively, on streamer 302c. The receiver electrodes 306 are arranged to measure voltages induced by the electric field resulting from interaction of the electromagnetic field induced by the EM transmitter with the various subsurface formations. The induced voltages will be related to the spatial distribution of electrical resistivity of the subsurface formations. When the receiver streamer system 300 is disposed in a body of water (not shown), an electric field resulting from interaction of the induced electromagnetic field within the subsurface layers below the water bottom can induce voltages (i.e., electromagnetic signals) across the paired electrodes 306a1, 306a2, 306b1, 306b2, 306c1, and 306c2. Such induced voltages can be detected by any form of voltage measuring circuit known in the art, where the voltage measuring circuit may be located remotely, for example, in a recording system on the survey vessel (e.g., 31 in FIG. 2B), or may be local to each paired electrode and digitized for telemetry along each streamer 302.

Figure 3B:
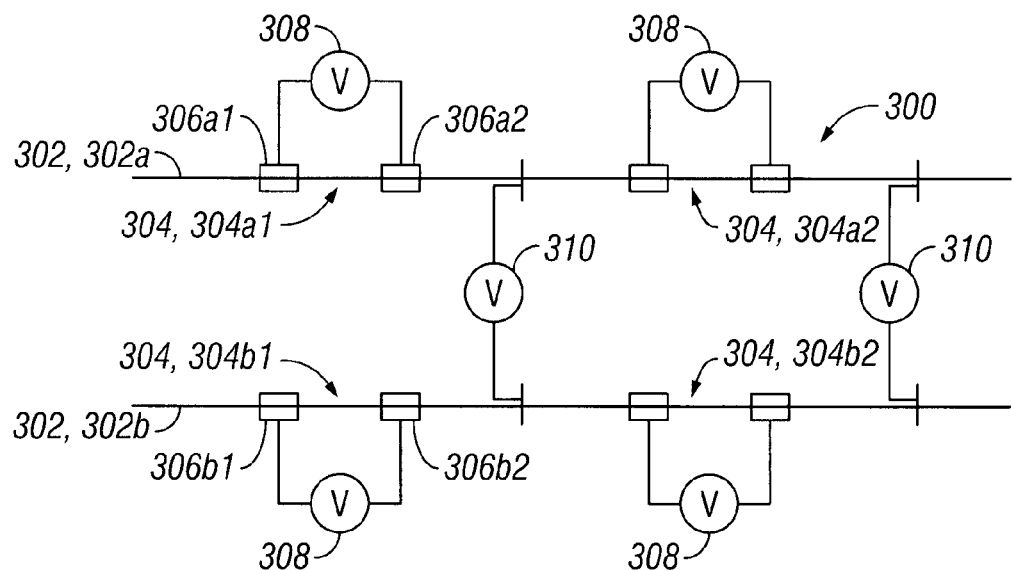
FIG. 3B illustrates measuring inline and cross-line voltages with the receiver streamer system of FIG. 3A.

Referring to FIG. 3B, voltage measurements made at each receiver node 304 in a direction along the length of the receiver cable 302, as shown at 308, are known as "inline" measurements. Measurements made at each receiver node 304 include voltage measurements across the pair of electrodes 306 located at that node. These measurements are referred to as inline measurements because they are along the direction of motion of the receiver system 300, which will be generally along the direction of motion of the vessel (31 in FIG. 2B) towing the receiver system 300. As an example, voltage measurements made across the electrodes at receiver nodes 304a1 and 304a2, respectively, are inline measurements. A representation of the voltage measurements being made is indicated by "V" in FIG. 3B Another type of measurement that can be made is "cross-line" measurement. Cross-line measurements are made across a pair of receiver nodes 304 on adjacent streamers 302, as shown at circuit 310. The voltage measurements may also be made across pairs of electrodes in laterally spaced apart streamers that are not adjacent to each other in the system 300. As an example, the receiver nodes 304a1, 304b1 form a cross-line measurement pair, and voltage measurements made across these nodes may be considered cross-line measurements. To make a cross-line measurement between receiver nodes 304a1, 304b1, for example, the receiver electrodes 306a1 can each be coupled to one terminal of a voltage measuring circuit, and the receiver electrodes 306b1 are coupled to the other terminal of the voltage measuring circuit. Cross-line measurements can be made parallel to the water surface (i.e., with receiver system 300 in horizontal orientation) or perpendicular to the water surface (i.e., with receiver system 300 in vertical orientation).

Referring once again to FIG. 3A, at each receiver node 304, the streamer 302 can include an electrode sleeve 311 made from electrically non-conductive material. The paired receiver electrodes 306 can be mounted on or within the electrode sleeve 311. Spacers 312 may be disposed between the receiver nodes 304. The spacers 312 may be buoyancy spacers, for example, made of buoyant materials such as foamed polypropylene. A wire bundle or harness 313 may extend from a bulkhead 315 and along the length of the receiver cable 302, passing through the electrode sleeve 311. Signal connection between the receiver electrodes 306 and the wire bundle or harness 313 may be made proximate to each receiver electrode 306. One or more strength members 314 may extend along the length of the streamer 302. The strength members 314 pass through the spacers 312 and sleeve 311. The strength members 314 may be made of fiber, such as one sold under the trademark VECTRAN, which is a registered trademark of Hoescht Celanese Corp., New York, N.Y. The strength member 314 may be made from any other preferably non-magnetic and electrically non-conductive material capable of bearing axial stress, such as will be caused by towing the streamer 302 through the body of water. The strength members 314 may be coupled together by towing equipment (not shown separately) at the forward (near vessel) end of the receiver system 300 such that they maintain a selected lateral spacing between adjacent cables 302, as will be familiar to those skilled in the art of marine seismic surveying. The streamer 302 may include an exterior jacket 316, which may be segmented at the sleeve 311 or may include openings at each electrode sleeve 311 to facilitate measurements using the receiver electrodes 306 mounted within the electrode sleeve 311. The jacket 316 is typically filled with a liquid such as oil or kerosene, or a gel or gel-like material. The bulkhead 315 may include measurement-related devices such as voltage measurement circuits and a multiplexer (not shown).

Figure 4A:
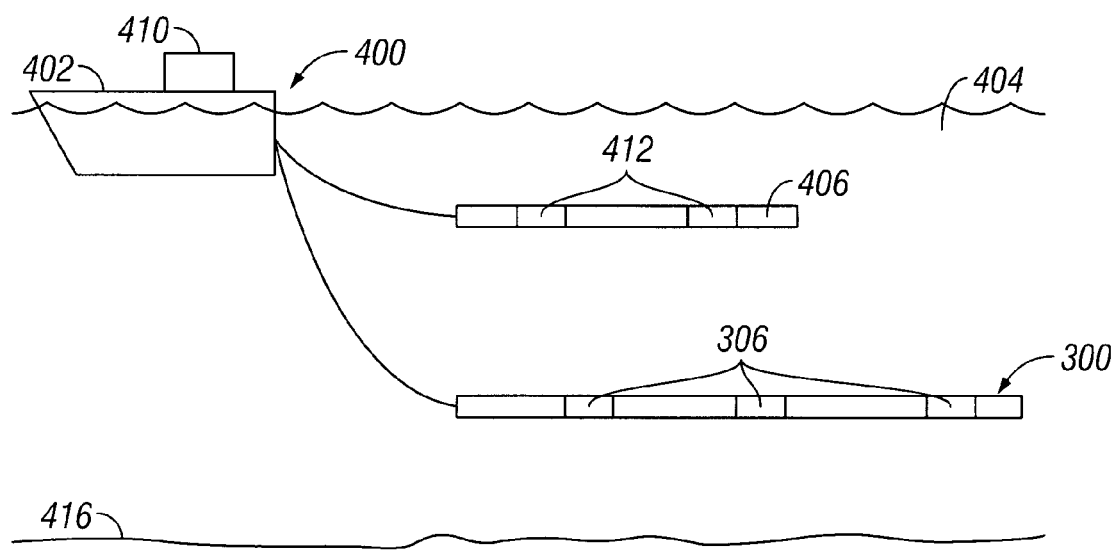
FIG. 4A illustrates a system for marine CSEM surveying including the receiver streamer system of FIG. 3A in a horizontal orientation.
Figure 4B:
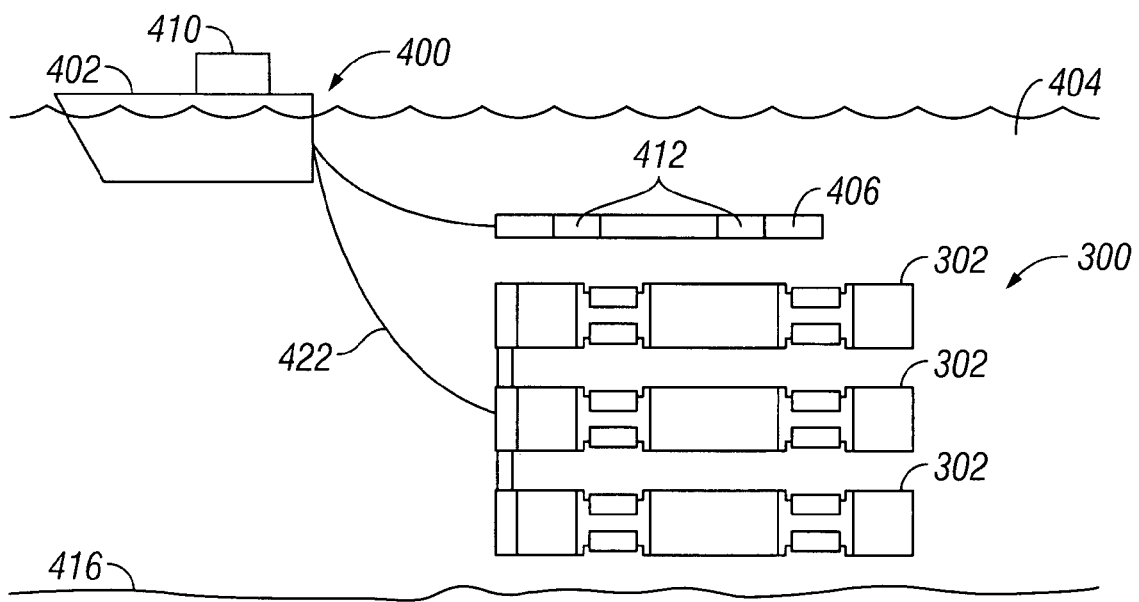
FIG. 4B illustrates a system for marine CSEM surveying including the receiver streamer system of FIG. 3A in a vertical orientation.

FIG. 4A shows an example of a marine electromagnetic survey system 400 including the receiver system 300 shown in FIG. 3A. The marine electromagnetic survey system 400 includes a survey vessel 402 moving along the surface of a body of water 404 such as a lake or the ocean. A source cable 406 and the receiver system (300 in FIG. 3A) are coupled to the vessel 402. The survey vessel 402 may include equipment, shown generally at 410 and referred to for convenience as a "recording system" that includes devices (none shown separately) for applying electric current to source electrodes 412 and/or other devices on the source cable 406, for navigating the vessel 402 and determining geodetic position of the vessel 402 and components towed by the vessel 402 in the water 404, and for recording signals detected by receiver electrodes 306 on the receiver system 300. In the configuration of FIG. 4A, the streamers (302 in FIG. 3A) in streamer system 300 are laterally spaced apart and towed at approximately the same depth in the water and therefore the receiver system 300 can be used to acquire cross-line voltage measurements in a horizontal orientation. In an alternate example, as illustrated in FIG. 4B, the receiver system 300 may have streamers (302 in FIG. 3A) disposed at substantially the same lateral position with respect to the survey vessel, but at different depths from each other. Thus, the example shown in FIG. 4B may be used to acquire cross-line voltage measurements in a vertical orientation. In the vertical orientation, a float (not shown) or other streamer depth control device known in the art for marine seismic surveying can be used to keep the attachment(s) 422, e.g., a cable, between the vessel 402 and the receiver system 300 vertical, or the spacers (312 in FIG. 3A) between the receiver nodes can be made buoyant and used to keep the receiver system 300 vertical.

Referring once more to FIG. 4A, the source cable 406 may include two source electrodes 412 disposed at spaced apart positions along the source cable 406. At selected times certain of the equipment in the recording system 410 conducts electric current across the source electrodes 412. The time varying component of such electric current produces an electromagnetic field that propagates through the water 404 and into the formations below the water bottom 416. The particular type of current conducted across the source electrodes 412 may be single- or multi-frequency alternating current, or various forms of switched direct current, such that either or both transient and frequency domain controlled source electromagnetic surveying may be performed. It should also be understood that the arrangement of the source electrodes 412 shown in FIG. 4A, referred to as horizontal electric dipole transmitter antenna, is not the only type of electromagnetic transmitter antenna that may be used in the invention. The source cable 406 could also include, in addition to or in substitution of the horizontal electric dipole transmitter antenna shown in FIG. 4A, any one or more of a vertical electric dipole antenna and horizontal or vertical magnetic dipole antenna (current loop). Accordingly, the electromagnetic field source antenna configuration shown in FIG. 4A is not intended to limit the scope of the present invention. If electrodes are used in the source cable 406, as shown in FIG. 4A, such electrodes may in some examples be configured as explained above with reference the receiver cable (302 in FIG. 3A) above.

In the foregoing explanation with reference to FIGS. 3A and 3B, the cross-line measurements are shown as being made between pairs of electrodes that are separate from those used to make the inline measurements on each streamer. It will be appreciated by those skilled in the art that one of the two electrodes in a pair of electrode associated with a node on each streamer could be also used to make cross-line voltage measurements.

An electromagnetic survey system as described herein may make both inline and cross-line electromagnetic signal measurements for, among other purposes, determining the distribution of electrical conductivity in the Earth's subsurface in a more efficient manner than surveying multiple times using only a single, inline measurement streamer.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A receiver streamer system for marine electromagnetic surveying, comprising:
    a first streamer, and a second streamer disposed substantially parallel to and laterally spaced apart from the first streamer; and
    a first pair of electrodes in the first streamer and a second pair of electrodes in the second streamer, each of the first and second pairs of electrodes functionally associated with a voltage measuring circuit configured to measure voltage along an inline direction, at least one electrode on each of the first and second streamer configured and associated with a voltage measuring circuit to make voltage measurements in a cross-line direction, wherein the first and second streamers are disposed at substantially a same depth in a body of water.

2. The receiver streamer system of claim 1, further comprising a plurality of pairs of electrodes at longitudinally spaced apart positions along each streamer, each pair of electrodes functionally associated with a voltage measuring circuit to make voltage measurements in an inline direction.

3. The receiver streamer system of claim 1, further comprising a voltage measuring circuit associated with longitudinally spaced apart pairs of electrodes, wherein each pair of electrodes includes one electrode on each of the first and second streamers at substantially equivalent longitudinal positions, the voltage measuring circuit configured to measure voltages in a cross line direction.

4. The receiver streamer system of claim 1, wherein a lateral spacing between the first and second streamers is in a range from 30 meters to 1000 meters.

5. The receiver streamer system of claim 1, wherein each streamer includes a plurality of longitudinally spaced apart pairs of electrodes, and a spacing between adjacent pairs of electrodes in each streamer is in a range of 10 meters to 500 meters.

6. A method for marine electromagnetic surveying, comprising:

towing at least two streamers laterally spaced apart from each other through a body of water, each of the at least two streamers having thereon at least one pair of electrodes;

measuring voltage across the at least one pair of electrodes on each streamer to obtain inline voltage measurements; and measuring voltage across at least one pair of electrodes including at least one electrode on each of the two streamers to obtain cross line voltage measurements, wherein the at least two streamers are disposed at substantially a same depth in the body of water.

7. The method of claim 6 wherein the voltage measurements are made in response to imparting an electromagnetic field into formations below the bottom of a body of water.

8. The method of claim 7 wherein the electromagnetic field is imparted by passing a time varying electric current across at least one pair of electrodes disposed in then body of water.

9. The method of claim 6 wherein the at least one pair of electrodes used to make the cross line voltage measurements includes electrodes separate from the electrodes in the at least one pair on each streamer used to make the inline voltage measurements.

* * * * *